United States Patent [19]

Sandstrom

[11] 4,375,497
[45] Mar. 1, 1983

[54] FREE FLOWING SBR BLACK MASTERBATCH POWDER

[75] Inventor: Paul H. Sandstrom, Tallmadge, Ohio

[73] Assignee: The Goodyear Tire & Rubber Company, Akron, Ohio

[21] Appl. No.: 297,287

[22] Filed: Aug. 27, 1981

[51] Int. Cl.$^3$ ............................ C08K 3/04; C08J 3/20; B32B 5/16; B44D 1/02
[52] U.S. Cl. ...................... 428/407; 523/206; 523/334; 524/156; 524/525; 524/526; 525/902; 427/222
[58] Field of Search ............... 260/42.55, 42.56, 42.14, 260/42.47; 428/407; 427/222; 524/156, 526, 525; 523/206, 334; 525/902

[56] References Cited

U.S. PATENT DOCUMENTS

| | | | |
|---|---|---|---|
| 3,294,733 | 12/1966 | Medalia et al. | 523/334 |
| 3,380,958 | 4/1968 | Rees | 523/334 |
| 3,813,259 | 5/1974 | Neubert | 427/222 |
| 3,920,604 | 11/1975 | Berg et al. | 260/42.54 |
| 3,922,240 | 11/1975 | Berg et al. | 260/42.55 |
| 3,929,707 | 12/1975 | Berg et al. | 260/42.55 |
| 3,945,978 | 3/1976 | Berg et al. | 260/42.55 |
| 3,998,778 | 12/1976 | Berg et al. | 523/334 |
| 4,073,755 | 2/1978 | Berg et al. | 260/42.47 |
| 4,138,375 | 2/1979 | Berg et al. | 260/42.47 |
| 4,212,918 | 7/1980 | Marquisee | 428/407 |
| 4,213,888 | 7/1980 | Karg et al. | 260/42.55 |
| 4,250,082 | 2/1981 | Sommer et al. | 523/334 |
| 4,265,939 | 5/1981 | Tebbens et al. | 525/901 |
| 4,271,213 | 6/1981 | Grimm et al. | 427/222 |
| 4,298,654 | 11/1981 | McCarty et al. | 428/407 |
| 4,333,969 | 6/1982 | Wright et al. | 428/407 |
| 4,333,970 | 6/1982 | Blommers et al. | 428/407 |

*Primary Examiner*—John C. Bleutge
*Assistant Examiner*—Herbert J. Lilling
*Attorney, Agent, or Firm*—J. Y. Clowney; A. T. Rockhill

[57] ABSTRACT

There is disclosed a process for the production of tack-free, pourable, filler containing elastomer powder which comprises
 (a) dispersing a carbon black filler in water;
 (b) mixing the thus dispersed carbon black filler with an elastomer latex;
 (c) coagulating the thus produced mixture of elastomer latex and carbon black with an acid/alum solution;
 (d) partitioning the thus coagulated suspension with a coating resin; and
 (e) filtering, washing and drying of the resultant powder, the improvement comprising using as a coating resin a mixture of a styrene/butadiene resin and a styrene/α-methylstyrene or a polystyrene resin wherein the weight ratio of the styrene/butadiene resin to the styrene/α-methylstyrene or polystyrene resin ranges between 4/1 and 1/4, said resins containing a mixture of added surfactants, the first being sodium lauryl sulfate and the second being a nonionic isooctyl phenoxy polyethoxy ethanol which contains 10 moles of ethylene oxide in the polyethoxy portion thereof, said mixture of surfactants being added in an amount at least 4 percent by weight and being in a weight ratio of sodium lauryl sulfate to the nonionic surfactant ranging from 2/1 to 1/2, and wherein the coagulation temperature ranges from 70° to 90° C.

9 Claims, No Drawings

FREE FLOWING SBR BLACK MASTERBATCH POWDER

BACKGROUND OF THE INVENTION

The present invention relates to a process of obtaining solid elastomeric products, containing a filler, in the form of dry free flowing powders which do not conglomerate or experience flaking or separation of the resin coating or filler during storage and handling. These materials can be used for injection molding of elastomeric articles. To incorporate a filler into an elastomer normally requires the use of rolling mills or internal mixers. The operation of these machines require large expenditures of energy. In times of energy shortages it is desirous to find a method of avoiding large energy expenditures. It is for this reason an investigation was made for a method of incorporation of a filler into an elastomer to form a pourable powder without resorting to these high energy using machines. It was also of interest to convert the rubber to a form in which automated equipment can be used in handling the product during processing.

A large number of references are cited which deal with pulverulent elastomeric mixtures and with the possibilities of pulverized elastomer technology. Only recently have methods been disclosed for making pulverulent pourable elastomer mixtures, such as elastomercarbon black mixtures.

U.S. Pat. Nos. 3,920,604 and 3,945,978 describe processes of preparing an elastomer containing a filler by emulsifying a solvent solution of the elastomer and the filler, flashing off the solvent and coagulating the mixture to a pourable powder.

Also of interest is U.S. Pat. No. 4,073,755, which describes a process for the production of pulverulent, tack-free, pourable filler-containing elastomer particles by precipitating a stable emulsified homogeneous mixture of an aqueous elastomer emulsion and an aqueous dispersion of a solid filler in the presence of sodium silicate, separating the thus precipitated elastomeric mixture from water and drying the mixture to a tack-free powder. Although this method initially gives a tack-free powder, the powder tends to conglomerate on storage when exposed to the atmosphere. This is probably caused by the silicic acid used to coagulate the mixture. After coagulation the resultant acid solution is neutralized to form a salt which is partly incorporated in the elastomer-filler powder and is not readily removed even by washing. When exposed to the atmosphere the resultant salt deliquesces causing the particles to conglomerate.

A method making a resin encapsulated elastomer is described in U.S. Pat. No. 3,813,259. In that invention the rubber is coated with a resin partitioning agent by agglomerating the resin from its latex at a specific temperature which must be within 5° C. of the agglomeration temperature of the resin. This temperature is critical for the adherence of the resin coating to the elastomer.

According to the present invention the problems discussed above with the products and processes are eliminated. The pulverulent elastomer when exposed to the atmosphere on storage remains dry and does not conglomerate. The elastomer slurry can be coated with the mixture of resins at a wider temperature range and at one much lower than the agglomeration temperature without flaking or separation of the resin mixture from the elastomer. The invention also incorporates the carbon black into the elastomer without the use of high energy equipment.

SUMMARY OF THE INVENTION

In a process for the production of tack-free, pourable, filler containing elastomer powder which comprises
(a) dispersing a carbon black filler in water;
(b) mixing the thus dispersed carbon black filler with an elastomer latex;
(c) coagulating the thus produced mixture of elastomer latex and carbon black with an acid/alum solution;
(d) partitioning the thus coagulated suspension with a coating resin; and
(e) filtering, washing and drying of the resultant powder, the improvement comprising using as a coating resin a mixture of a styrene/butadiene resin and a styrene/α-methylstyrene or a polystyrene resin wherein the weight ratio of the styrene/butadiene resin to the styrene/α-methylstyrene or polystyrene resin ranges between 4/1 and 1/4, said resins containing a mixture of added surfactants, the first being sodium lauryl sulfate and the second being a nonionic isooctyl phenoxy polyethoxy ethanol which contains 10 moles of ethylene oxide in the polyethoxy portion thereof, said mixture of surfactants being added in an amount at least 4 percent by weight and being in a weight ratio of sodium lauryl sulfate to the nonionic surfactant ranging from 2/1 to 1/2, and wherein the coagulation temperature ranges from 70° to 90° C.

DETAILED DESCRIPTION

The elastomers to which this invention is particularly applicable are all synthetic elastomeric polymers in the form of latices. Representatives of these polymers are styrene/butadiene rubbers, acrylonitrile/butadiene rubbers, polypropylene rubbers, polybutadiene rubbers, polyisoprene rubbers, and copolymers of dimethyl butadiene/butadiene rubbers. As previously noted the elastomers are in the form of a latex. The elastomers may be oil-extended and contain other ingredients such as antioxidants.

The carbon black fillers used in this invention are generally the reinforcing type such as high abrasion furnace (HAF), intermediate super abrasion furnace (ISAF), and fast extrusion furnace (FEF). The carbon black, if pelletized, must first be reduced to a powdered form from the usual pelletized form. This is done by mixing the pelletized carbon black with the water and with or without dispersant in a high speed mixer. Although the carbon black can be dispersed without dispersant, a dispersant may be used. If a dispersant is employed, a purified free acid pine lignin dispersant (Indulin TM AT) is used in 3 to 6 percent by weight concentration based on the carbon black. The lignin dispersant is solubilized with a small amount of NaOH.

The dispersed carbon black is then incorporated into the elastomer latex. The use of this procedure prevents the conglomeration of the dried elastomeric product and the formation of any free carbon black.

The coating resins used for practicing this invention are a combination of two types. The use of two types of resins imparts a synergistic effect to the final product. These resins consist of a styrene/butadiene (S/B) resin with a styrene to butadiene weight ratio of 75/25 to 95/5 in combination with a styrene/α-methylstyrene (S/M) resin with a styrene to α-methylstyrene weight ratio of 99/1 to 50/50. A pure polystyrene resin (PS) may be used instead of the S/M resin. The combination of both resins allows a higher temperature for drying and causes the S/M resin to adhere without flaking. The ratio of the SB resin to the S/M or PS resin may vary between 1/4 and 4/1 is used as a latex at a solid content of about 2 to 10 weight percent, preferably 2 to 5 percent. When equal amounts of the two coating resins are used, as little as 2 parts per hundred rubber (phr) will give a free flowing powder with no free resin, no conglomeration of the powders, high density and small particle size distribution. At least 4 and up to 8 parts per hundred of rubber of the mixture of resins can be used but the excess is usually unnecessary.

There are added to these mixtures of partitioning resins, two surfactants, one surfactant being sodium lauryl sulfate (SLS) and a nonionic type, isooctyl phenoxy polyethoxy ethanol containing 10 moles of ethylene oxide in the polyethoxy portion thereof (Triton TM X-100). This mixture of surfactants is added in concentrations of 4 to 8 weight percent based on the total weight of resin and are in a weight ratio of SLS to Triton TM X-100 of 2/1 to 1/2. It has been found that this mixture of surfactants is required to prevent the resin from becoming dislodged from the resin coated polymer particles and, thus, allowing the finished product to contain free resin.

The mixture of coating resins is added to the coagulated rubber latex carbon black slurry while maintaining the coagulation temprature in the 70° to 90° C. range.

The use of acid/alum as a coagulant is presently known. However, in this invention the method, the amounts and the concentrations employed in the coagulation step are quite specific. The elastomer-filler latex mixture is coagulated by the use of a dilute acid/alum solution at a pH 2-4 at various temperatures and ratios of alum to elastomer. The temperature of coagulation can vary from 60°-90° C. and the concentration of the alum varies between 2-20 parts per hundred rubber. The preferred temperature is 70°-90° C. and the preferred concentration of alum is 3-15 parts per hundred rubber. The concentration of the alum solution may vary between 0.1 and 1%. The elastomer-filler particles should be maintained as an aqueous slurry during the coating process.

The desired results of this invention are obtained when a dilute resin latex coagulates on the elastomer-filler particles in the slurry. This is achieved by adding a silute resin mixture latex, 2 to 10, preferably 2 to 5 solids, to the dilute coagulant 0.01 to 2 percent by weight in the water in which the particles are slurried. The temperature should be maintained in the 70° to 90° C. range during coagulation of the resins.

The coagulation temperature is not required to be within 5° C. of the agglomerating temperature of the coating resins. Thus, less heat energy is used to produce free-flowing powders havin resin coatings of high heat distortion temperatures which should exhibit better storage stability. The procedure outlined in U.S. Pat. No. 3,813,259 would require temperatures at or above 100° C. to effectively coat the powders with resins of the styrene/α-methylstyrene copolymer type. Even if one considers the case where the ratio of styrene to α-methylstyrene is 100/0, which is polystyrene, the agglomeration temperature of 106° C. as presented in U.S. Pat. No. 3,813,259 would require a resin coating step process at temperatures of about 100° C., which is clearly above our temperature range of 70° to 90° C. A styrene/α-methylstyrene copolymer having a 75/25 weight percent monomer charge ratio would be expected to exhibit a higher agglomeration temperature than polystyrene, since it exhibits a glass transition temperature, $T_g$, above 110° C. as compared to a value of about 95° C. for polystyrene. The $T_g$ of a resin relates to a specific temperature at which it loses its hardness or brittleness and becomes more flexible and takes on rubber-like properties. Using these particular resins in a process of resin coating according to U.S. Pat. No. 3,813,259 would require resin coating temperatures above 100° C. Operating at these temperatures with an aqueous system would require closed high pressure vessels and add substantially to the cost of the resin coating process.

The resin elastomer-filler particles of this invention after drying form free-flowing powders which at least 90 percent by weight are below 1 mm in size. Those exhibiting greater than 10 percent by weight above 1 mm are defined in this invention as being conglomerated. Conglomeration is considered to take place when several of the primary particles from the coagulation step are fused together during the drying process.

The following experiments show the improvement that is obtained by using the process of this invention. They are merely illustrative and should not be limitive of the invention.

EXAMPLE 1

A. Preparation of Carbon Black Dispersion

A fluid dispersion (10 percent total solids) containing 6 parts Indulin TM AT per hundred parts carbon black was prepared by mixing the following composition for 5 minutes in a Waring blender.

HAF carbon black: 250 grams
Indulin TM AT solution: 100 grams
Water: 2300 grams

The Indulin TM AT solution (15 percent total solids) was prepared by adding 10 parts sodium hydroxide to water at 50°-60° C. and slowly mixing in 100 parts Indulin TM AT. The sodium hydroxide is added to solubilize the Indulin TM AT.

B. Mixture of Carbon Black Dispersion and SBR Latex

SBR 1712 latex (75/25 butadiene/styrene monomer charge; 23 percent solids) containing a hindered phenol antioxidant was slowly added with gentle low-shear stirring to the carbon black dispersion to give the following compound composition.

SBR elastomer (dry weight): 50 grams
Carbon black + Indulin TM AT: 40 grams
Antioxidant: 625 grams C. Preparation of Powdered Rubbers Several mixtures of the above SBR latex and carbon black dispersion were separately added into a vigorously stirred coagulant solution containing 2 liters of acidified water (pH=2.5) and 10 grams of alum at a temperature of 90° C. The resultant slurries of coagulated elastomer-filler particles were resin coated by slowly adding with agitation 100-200 milliliters of a 2 percent solids resin latex while maintaining a temperature of 90° C. The resin latices consisted of equal weight parts each of a 90/10 styrene/butadiene resin (S/B) and a 75/25 styrene/α-methyl styrene resin (S/M). The resin latices contained 3 parts of potassium fatty acid soap per 100 parts of resin, since it was present during their preparation by emulsion polymerization initiated with potassium persulfate. They also contained various amounts of post polymerization added sodium lauryl sulfate and Triton TM X-100 nonionic surfactant. The powdered rubber products were filtered hot, washed with cold water and dried on trays in a forced draft oven at 85° C. for about 4 hours. The dried powder samples were examined for the presence of free resin and their particle size determined by use of standard mesh screens. The importance of the combination of the two post added surfactants is illustrated from the results shown in Table I. All of the isolated powders showed no evidence of conglomeration during drying, except Sample A which came out of the drying oven in large lumps and Sample B which had 35 percent by weight of its particles above 1 mm (1,000 microns) after drying. The resin coated powders produced with resin latices containing no added surfactant (Sample A) or either surfactant alone (Samples B and C) contained substantial amounts of visible free resin. However, the combination of surfactants in the resin latex produced resin coated powders without free resin.

EXAMPLE 3

Another series of powders were prepared to determine the effect of oven drying temperature on conglomeration when using two different resin coating mixtures. The amounts of SBR latex and carbon black and the conditions of coagulation were identical to Example 1. The resin latices consisted of a 90/10 styrene/butadiene resin (S/B) and a 75/25 styrene/α-methylstyrene resin (S/M) in the amounts shown in Table III. The resin latices contained 3 parts of potassium fatty acid soap per 100 parts of resin, which was present during their preparation by emulsion polymerization. They also contained 4 parts of sodium lauryl sulfate and 8 parts of Triton TM X-100 nonionic surfactant which were added after polymerization. Samples A, B and C, which contained the S/B resin exhibit increasing amounts of conglomeration as the drying temperature is increased from 75° to 95° C., whereas those samples prepared with equal amounts of S/B and S/M resin do not exhibit conglomeration even at the 95° C. drying temperature.

TABLE I

| | | Post Added Resin Surfactants** | | | Particle Size, Microns (% by weight) | | | |
|---|---|---|---|---|---|---|---|---|
| Sample | Coating Resin* | Sodium Lauryl Sulfate | Triton TM X-100 | Free Resin | >1000 | 1000-600 | 600-300 | 300-75 |
| A | 8 | 0 | 0 | Yes | — | — | — | — |
| B | 8 | 4 | 0 | Yes | 36 | 39 | 21 | 4 |
| C | 8 | 0 | 8 | Yes | 10 | 51 | 31 | 8 |
| D | 8 | 4 | 8 | No | 0 | 17 | 62 | 21 |
| E | 6 | 6 | 6 | No | 0 | 14 | 61 | 25 |
| F | 6 | 8 | 8 | No | 1 | 16 | 63 | 20 |
| G | 4 | 8 | 8 | No | 0 | 12 | 64 | 24 |

*Parts of resin per 100 parts of SBR elastomer.
**Parts of surfactant per 100 parts of combined S/B and S/M resins.

EXAMPLE 2

Another set of experiments were conducted using the procedure as outlined in Example 1. The only variation from Example 1 involves the coating resins. The resin latices consisted of a 90/10 styrene/butadiene resin (S/B) and a 75/25 styrene/α-methylstyrene resin (S/M) in the amounts shown in Table II. The resin latices contained 3 parts of potassium fatty acid soap per 100 parts of resin, which was present during their preparation by emulsion polymerization. They also contained 4 parts of sodium lauryl sulfate and 8 parts of Triton TM X-100 nonionic surfactant which were added after polymerization. Although none of the isolated samples exhibited conglomeration of their particles during drying (at least 90 weight percent below 1000 microns), Samples A and B, which contained either resin alone showed the presence of free resin after drying. Those samples prepared with equal amounts of S/B and S/M gave no evidence of free resin or conglomeration even when only 4 total parts of resin was used.

| Sample | Coating Resin* S/B | S/M | Drying Temperature, °C. | Conglomeration | Particle Size, Microns (% by weight) >1000 |
|---|---|---|---|---|---|
| A | 4 | 0 | 75 | Yes | 12 |
| B | 4 | 0 | 85 | Yes | 23 |
| C | 4 | 0 | 95 | Yes | 29 |
| D | 4 | 4 | 75 | No | 2 |
| E | 4 | 4 | 85 | No | 6 |
| F | 4 | 4 | 95 | No | 9 |

*Parts of resin per 100 parts of SBR elastomer.

EXAMPLE 4

The importance of the weight ratio of the latex and the carbon black dispersion to the coagulant and the amount of alum in the acid/alum coagulant was determined in another series of experiments. Several mixtures of SBR latex and carbon black dispersion containing Indulin TM AT as described in Example 1, were separately added into a vigorously stirred coagulant solution containing 6 liters of acidified water (pH=2.5)

TABLE II

| | Coating Resin* | | Free | | ←Particle Size, Microns→ (% by weight) | | | |
|---|---|---|---|---|---|---|---|---|
| Sample | S/B | S/M | Resin | Conglomeration | >1000 | 100-600 | 600-300 | 300-75 |
| A | 8 | 0 | Yes | No | 10 | 52 | 35 | 3 |
| B | 0 | 8 | Yes | No | 3 | 33 | 52 | 12 |
| C | 4 | 4 | No | No | 2 | 17 | 62 | 19 |
| D | 3 | 3 | No | No | 2 | 30 | 54 | 14 |
| E | 2 | 2 | No | No | 3 | 35 | 50 | 12 |

*Parts of resin per 100 parts of SBR elastomer and various amounts of alum at a temperature of 90° C. (Table IV). The resultant slurries of coagulated-filler particles were resin coated with 6 parts of resin per 100 parts of rubber at 90° C. with resin latices consisting of equal weight parts each of a 90/10 styrene/butadiene resin (S/B) and a 75/25 styrene/α-methylstyrene resin (S/M). The resin latices contained 3 parts of potassium fatty acid soap per 100 parts of resin and 6 parts each of sodium lauryl sulfate and Triton TM X-100 nonionic surfactant. The powdered rubbers were filtered hot, washed with cold water and dried at 80° C. for about 4 hours in a forced draft oven. The dried powder samples were examined for the presence of free resin and their particle size determined by use of standard mesh screens. A crude bulk density was also determined by weighing a 100 cc volume of powder after being tapped lightly in a graduate. In Series A of Table IV, the results show that increasing the amount of SBR and carbon black produces an increase of bulk density and a decrease of particle size when using a constant level of alum in the coagulant. In Series B, an increase of alum produces a decrease of bulk density and particle size when using a constant weight of SBR and carbon black. These results indicate the importance of coagulation conditions, particularly alum level and coagulant volume for producing a resin free nonconglomerated free flowing powder.

TABLE IV

| Series | SBR grams | Carbon Black* grams | Alum grams | Free Resin | Density grs/cc | Particle Size, Microns (% by weight) | | | |
|---|---|---|---|---|---|---|---|---|---|
| | | | | | | <1000 | 1000-600 | 600-300 | <300 |
| A | 150 | 120 | 30 | No | .36 | 49 | 20 | 25 | 6 |
|   | 300 | 240 | 30 | No | .42 | 1 | 6 | 53 | 40 |
|   | 600 | 480 | 30 | No | .43 | 0 | 7 | 66 | 27 |
| B | 300 | 240 | 15 | No | .45 | 3 | 4 | 32 | 61 |
|   | 300 | 240 | 30 | No | .42 | 1 | 6 | 53 | 40 |
|   | 300 | 240 | 60 | Yes | .39 | 49 | 37 | 13 | 1 |

*The weight in grams also includes the contribution of Indulin TM AT.

EXAMPLE 5

Another series of powders were prepared to determine the effect of coagulation temperature on particle size and the presence of free resin in the dried powders. The SBR 1712 latex and carbon black dispersion containing Indulin TM AT were used in an amount which produced powders containing 300 grams of SBR and 240 grams of carbon black and Indulin TM AT. The coating resin consisted of 3 parts each of a 90/10 styrene/butadiene resin and a 75/25 sytrene/α-methylstyrene resin, which gave a total resin level of 6 parts per 100 parts of SBR rubber in the powders. The resin latices also contained 3 parts of potassium fatty acid soap and 6 parts each of lauryl sulfate and Triton TM X-100 per 100 parts of resin. The samples were coagulated at 60° to 90° C. as shown in Table V and dried in a forced draft oven for about 4 hours at 80° C. The results in Table V show that excellent free flowing powders which contain no free resin or conglomeration can be prepared at temperatures as low as 70° C. At 60° C. powders are obtained which contain free resin and conglomeration after drying.

TABLE V

| Coagulation* Temperature, °C. | Free Resin | Particle Size | | | |
|---|---|---|---|---|---|
| | | >1000 | 1000-600 | 600-300 | <300 |
| 90 | No | 1 | 6 | 53 | 40 |
| 80 | No | 3 | 15 | 50 | 32 |
| 70 | No | 2 | 21 | 58 | 19 |
| 60 | Yes | 16 | 49 | 31 | 4 |

*The coagulant contained 6 liters of water and 30 grams of alum (pH = 2.5).

EXAMPLE 6

Another series of powders were prepared to show the effect of resin type and level on particle size and the presence of free resin in the dried powders. The SBR 1712 latex and carbon black dispersion containing Indulin TM AT were used in an amount which produced powders containing 300 grams of SBR and 240 grams of carbon black and Indulin TM AT. The coating resins consisted of the indicated amounts of a 90/10 styrene/butadiene resin (S/B) and a 75/25 styrene/α-methylstyrene resin (S/M) which contained 3 parts of potassium fatty acid soap and 6 parts each of lauryl sulfate and Triton TM X-100 per 100 parts of resin. The samples were coagulated at 80° C. and dried in a forced draft oven for about 4 hours at 80° C. The results in Series A of Table VI show that a powder prepared with the S/B resin alone exhibits conglomeration after drying, whereas a powder prepared with the S/M resin alone does not exhibit conglomeration but contains substantial visible amounts of free resin in the dried powder. Combinations of the two resins produce excellent free flowing powders without conglomeration or the presence of free resin. In Series B the results show that when using equal amounts of the S/B and S/M resin, excellent powders can be prepared with as little as 2 parts of coating resin.

TABLE VI

| Series | Coating Resin* | | Free Resin | Particle Size, Microns (% by weight) | | | |
|---|---|---|---|---|---|---|---|
| | S/B | S/M | | >1000 | 1000-600 | 600-300 | <300 |
| A | 6 | 0 | No | 48 | 26 | 22 | 4 |
| ↓ | 4 | 2 | No | 9 | 16 | 43 | 32 |
| ↓ | 3 | 3 | No | 2 | 30 | 54 | 24 |
| ↓ | 2 | 4 | No | 0 | 6 | 60 | 34 |
| ↓ | 0 | 6 | Yes | 0 | 13 | 59 | 28 |
| B | 3 | 3 | No | 2 | 30 | 54 | 16 |
| ↓ | 2 | 2 | No | 6 | 43 | 44 | 7 |
| ↓ | 1 | 1 | No | 3 | 22 | 58 | 17 |
| ↓ | .5 | .5 | No | 24 | 22 | 42 | 12 |

*Parts of resin per 100 parts of SBR elastomer.

EXAMPLE 7

SBR 1712 latex containing a hindered phenol antioxidant was mixed with a carbon black dispersion containing 6 parts of Indulin TM AT per 100 parts of carbon black to give the following composition.

SBR elastomer (dry weight): 100 grams

Carbon black+Indulin TM AT: 160 grams
Antioxidant: 1.25 grams

This mixture was added into a coagulant solution containing 2 liters of acidified water (pH=2.5) and 10 grams of alum at a temperature of 90° C. The resultant slurry of coagulated elastomer-filler particles was resin coated with 3 parts each of a 90/10 styrene/butadiene resin and a 75/25 styrene/α-methylstyrene resin per 100 parts of SBR elastomer. After filtration, washing and drying a free flowing powder was obtained which was used in a vulcanized rubber tire.

EXAMPLE 8

A. Preparation of Carbon Black Dispersion

A fluid dispersion (9.7% total solids) containing 3 parts Indulin TM AT per hundred parts carbon black was prepared by mixing the following composition for 5 minutes in a Waring blender.

SRF carbon black: 250
Indulin TM AT solution: 50
Water: 2350

The Indulin TM AT solution (15% total solids) was prepared by adding 10 parts sodium hydroxide to water at 50°-60° C. and slowly mixing in 100 parts Indulin TM AT.

B. Mixture of Carbon Black Dispersion and Chemigum Latex

Chemigum N-608 and N-612 latices (copolymers of butadiene and acrylonitrile) containing Wingstay T and Wingstay 29 antioxidants were slowly added with mixing to the carbon black dispersion to give the following compound composition.

Chemigum N-608 (dry weight): 40 grams
Chemigum N-612 (dry weight): 60 grams
Carbon black+Indulin TM AT: 125 grams
Wingstay T: 1 gram
Wingstay 29: 0.6 grams C. Preparation of Powdered Rubber The mixture of Chemigum latices and carbon black dispersion was added into a coagulant solution containing 2 liters of acidified water (pH=2.5) and 10 grams of alum at a temperature of 90° C. The coagulated elastomer-filler particles were resin coated at 90° C. with 6 parts of resin per 100 parts or rubber. The resin was a blend of 3 parts each of a 90/10 styrene/butadiene resin and a 75/25 styrene/α-methylstyrene resin prepared with 3 parts of potassium fatty acid soap as emulsifier and containing 6 parts of lauryl sulfate and 8 parts of Triton TM X-100 as post-added surfactants. The powder slurry was filtered, washed, and dried on trays in a forced draft oven at 80° C. for about 5 hours. The dried powder showed no evidence of free resin or free carbon black and also exhibited excellent flow behavior. The particle size distribution is shown below:

| | Particle Size, Microns | | |
|---|---|---|---|
| >1000 | 1000–600 | 600–300 | <300 |
| 5 | 45 | 45 | 5 |

EXAMPLE 9

A. Preparation of Carbon Black Dispersion

A fluid dispersion (5% total solids) was prepared by mixing the following composition for 5 minutes in a Waring blender.

HAF carbon black: 100 grams
Water: 1900 grams

B. Mixture of Carbon Black Dispersion and SBR Latex

SBR 1712 latex containing a hindered phenol antioxidant was slowly added to the carbon black dispersion to give the following compound composition SBR elastomer (dry weight): 100 grams
Carbon black: 80 grams
Antioxidant: 1.25 grams C. Preparation of Powdered Rubber The mixture of SBR latex and carbon black dispersion was added into a coagulant solution containing 2 liters of acidified water (pH=2.5) and 10 grams of alum at a temperature of 90° C. The coagulated powder was resin coated at 90° C. with 6 parts of a 50/50 blend of a 90/10 styrene/butadiene resin and a 75/75 styrene/α-methylstyrene resin per 100 parts of SBR rubber. The powder was filtered, washed, and dried on a tray in a forced draft oven for about 4 hours at 80° C. The dried powder was free flowing and showed no evidence of free resin. The particle size distribution is shown below:

| | Particle Size, Microns | | |
|---|---|---|---|
| >1000 | 1000–600 | 600–300 | <300 |
| 0 | 6 | 25 | 69 |

EXAMPLE 10

A. Preparation of Carbon Black Dispersion

A fluid dispersion (10% carbon black by weight) containing 6 parts Indulin TM AT per hundred parts carbon black was prepared by mixing the following composition for 20 minutes in a Littleford mixer.

HAF Carbon black: 1.0 parts
Indulin TM AT solution: 0.4 parts
Water: 8.6 parts

The Indulin TM AT solution is described in Example 1.

B. Mixture of Carbon Black Dispersion and SBR Latex

SBR 1712 latex containing a hindered phenol antioxidant was added to the carbon black dispersion to give the following compound composition.

SBR elastomer (dry weight): 600 grams
Carbon Black+Indulin TM AT: 509 grams
Antioxidant: 7.5 grams C. Preparation of Powdered Rubbers Several mixtures of the above SBR latex and carbon black dispersion were separately added into a stirred coagulant solution containing 6 liters of acidified water (pH=2.5) and 30 grams of alum at a temperature of 80° C. The resultant slurries of coagulated elastomer-filler particles were resin coated with 1500 milliliters of a 2% solids resin latex while maintaining a temperature of 80° C. The resin latices contained 3 parts of potassium fatty acid soap and also 6 parts each of sodium lauryl sulfate and Triton TM X-100 per 100 parts of resin. After filtration and washing the powdered rubber products were dried on trays in a forced draft oven at 80° C. for about 4 hours. The dried powder samples did not contain free resin and were easily broken into a free-flowing powder. A storage test was carried out to evaluate the effect of the resin on the powder samples. Each of the powders was placed in a hollow pipe having an inside diameter of 1.25 inches. A cork was placed in one end of the pipe and a piston placed in the other. The weight of the piston corresponds to the approximate weight of which 5 meters of the product would exert. This assembly was placed in a hot air circulating oven for 24 hours at 50° C. After the samples had cooled a qualitative evaluation of the work necessary to render the plug shaped powders into a free-flowing state was recorded. The resin types evaluated and the storage test results are shown in Table VII.

TABLE VI

| Sample | Coating Resin, pts. | | | Storage Test Results |
|---|---|---|---|---|
| | 90/10* S/B | 95/5** S/B | 100*** S | |
| A | 5 | 0 | 0 | Molded into solid plug |
| B | 0 | 0 | 5 | Easily broken into free-flowing powder |
| C | 0 | 5 | 0 | Broken with some difficulty into free-flowing powder |
| D | 2.5 | 0 | 2.5 | Easily broken into free-flowing powder |
| E | 0 | 2.5 | 2.5 | Easily broken into free-flowing powder |

*90/10 styrene/butadiene copolymer resin
**95/5 styrene/butadiene copolymer resin
***Polystyrene resin This invention is also directed to the compositions prepared in accordance with the process described in the Summary of the Invention.

Attention is called to my copending application entitled, "Particle Size Control of SBR/Carbon Black Powder," filed on even data herewith as United States Ser. No. 297,035, whose total disclosure is incorporated herein by reference.

While certain representative embodiments and details have been shown for the purpose of illustrating the invention, it will be apparent to those skilled in this art that various changes and modifications may be made therein without departing from the scope of the invention.

I claim:

1. A process for the production of tack-free, pourable, filler containing elastomer powder which comprises
   (a) dispersing a carbon black filler in water;
   (b) mixing the thus dispersed carbon black filler with an elastomer latex;
   (c) coagulating the thus produced mixture of elastomer latex and carbon black with an acid/alum solution;
   (d) partitioning the thus coagulated suspension with a coating resin; and
   (e) filtering, washing and drying of the resultant powder, the improvement comprising using as a coating resin a mixture of a styrene/butadiene resin and a styrene/α-methylstyrene or a polystyrene resin wherein the weight ratio of the styrene/butadiene resin to the styrene/α-methylstyrene or polystyrene resin ranges between 4/1 and ¼, said resins containing a mixture of added surfactants, the first being sodium lauryl sulfate and the second being a nonionic isooctyl phenoxy polyethoxy ethanol which contains 10 moles of ethylene oxide in the polyethoxy portion thereof, said mixture of surfactants being added in an amount at least 4 percent by weight and being in a weight ratio of sodium lauryl sulfate to the nonionic surfactant ranging from 2/1 to ½, and wherein the coagulation temperature ranges from 70° to 90° C.

2. A process according to claim 1 wherein the carbon black is prepared using a purified free acid pine lignin dispersant in an amount which is 3 to 6 percent by weight concentration based on the weight of the carbon black.

3. A process according to claim 1 in which the styrene/butadiene resin contains a styrene to butadiene weight ratio ranging from 75/25 to 95/5 and the styrene/α-methylstyrene resin contains a styrene to α-methylstyrene weight ratio of 99/1 to 50/50.

4. A process according to claim 2 in which the styrene/butadiene resin contains a styrene to butadiene weight ratio changing from 75/25 to 95/5 and the styrene/α-methylstyrene resin contains a styrene to α-methylstyrene weight ratio of 99/1 to 50/50.

5. A process according to claim 1 wherein the styrene/butadiene resin has a styrene to butadiene weight ratio of 90/10 and the styrene/α-methylstyrene resin has a styrene to α-methylstyrene weight ratio of 75/25.

6. A process according to claim 2 wherein the styrene/butadiene resin has a styrene to butadiene weight ratio of 90/10 and the styrene-α-methylstyrene resin has a styrene to α-methylstyrene weight ratio of 75/25.

7. A process according to claim 1 in which the styrene/butadiene resin contains a styrene to butadiene weight ratio of 95/5 and the second resin is polystyrene.

8. A process according to claim 2 in which the styrene/butadiene resin contains a styrene to butadiene weight of 95/5 and the second resin is polystyrene.

9. As the composition of tack-free, pourable, filler containing elastomer powder which is prepared in accordance with the process of claim 1.

* * * * *